(12) United States Patent
Robinson et al.

(10) Patent No.: US 7,313,812 B2
(45) Date of Patent: Dec. 25, 2007

(54) APPLICATION LEVEL SECURITY

(75) Inventors: Philip Robinson, Durlach (DE);
Jochen Haller, Karlsruhe (DE)

(73) Assignee: SAP Aktiengesellschaft, Walldorf (DE)

( * ) Notice: Subject to any disclaimer, the term of this patent is extended or adjusted under 35 U.S.C. 154(b) by 895 days.

(21) Appl. No.: 10/453,873

(22) Filed: Jun. 4, 2003

(65) Prior Publication Data

US 2004/0034767 A1 Feb. 19, 2004

Related U.S. Application Data

(60) Provisional application No. 60/385,548, filed on Jun. 5, 2002.

(51) Int. Cl.
*H04L 9/00* (2006.01)
*H04L 9/32* (2006.01)

(52) U.S. Cl. .............................. 726/1; 726/3; 713/166

(58) Field of Classification Search ................ 726/1–6, 726/10, 17; 713/152, 156, 166, 168
See application file for complete search history.

(56) References Cited

U.S. PATENT DOCUMENTS

| | | | | |
|---|---|---|---|---|
| 5,935,248 | A * | 8/1999 | Kuroda ......................... | 726/14 |
| 6,892,307 | B1 * | 5/2005 | Wood et al. .................... | 726/8 |
| 7,089,584 | B1 * | 8/2006 | Sharma .......................... | 726/4 |

OTHER PUBLICATIONS

Atkinson, Bob, et al., "Web Services Security (WS-Security) Version 1.0," Apr. 5, 2002, International Business Machines Corporation, Microsoft Corporation, VeriSign, Inc., retrieved from the Internet on Jun. 18, 2004, at http://www-106.ibm.com/developerworks/webservices/library/ws-secure/, 28 pgs.

Avolio, Frederick M., "Firewalls: A Brief History," 2000, slideshow, retrieved from the Internet at http://www.avolio.com/pres/FirewallsHistory_files/, 18 pgs.

Bellovin, Steven M., "Distributed Firewalls," ;login:, Nov. 1999, pp. 37-39, retrieved from the Internet on Jun. 18, 2004, at http://www.research.att.com/~smb/papers/distfw.pdf, 11 pgs.

Box, Don, et al., "Simple Object Access Protocol (SOAP) 1.1: W3C Note, May 8, 2000," retrieved from the Internet on Jun. 18, 2004, at http://www.w3.org/TR/SOAP, 35 pgs.

Celestial, "A Security Management Architecture for Providing Survivable Security Services in Heterogeneous Networking Environments," Apr. 1999, retrieved from the Internet at http://projects.anr.mcnc.org/Celestial/Celestial.html, 3 pgs.

(Continued)

*Primary Examiner*—Hosuk Song
(74) *Attorney, Agent, or Firm*—Fish & Richardson P.C.

(57) ABSTRACT

Techniques for providing application layer security may be facilitated by an arbitrator. In general, in one implementation, an arbitrator may receive a security tender including security requirements for an application, search for security services to fulfill the security requirements, determine whether discovered security services can satisfy the security requirements, and, if security services that can satisfy the security requirements exist, generate a security contract for the application, the security contract specifying how the application is to communicate with the security services that can satisfy the security requirements.

18 Claims, 6 Drawing Sheets

OTHER PUBLICATIONS

Cheswick, Bill, "An Evening with Berferd in Which a Cracker is Lured, Endured, and Studied," AT&T Bell Laboratories, 1991, retrieved from the Internet at http://www.tracking-hackers.com/papers/berferd.pdf, 11 pgs.

Cisco, "Understanding Internet Security Risks," retrieved from the Internet on Jun. 18, 2004, at http://www.dtr.com.br/cdrom/cc/cisco/mkt/isol/secur/centr/centr_wp.htm.

CORBA Security, "CORBA Security Conformance Statement," Nov. 28, 2000, retrieved from the Internet on Aug. 20, 2004, at http://doc.ece.uci.edu/TAO/Security/Conformance.html, 4 pgs.

Ellermann, Uwe, "IPv6 and Firewalls," *DFN-CERT*, University of Hamburg, Jun. 1996, retrieved from the Internet on Jun. 22, 2004, at http://www.dfn-cert.de/eng/team/ue/fw/ipv6fw, 15 pgs.

"Ernst & Young and Computer Associates Forge Alliance to Deliver World-Class Information Security and Risk Management Services," PR Newswire, Apr. 22, 2002, retrieved from the Internet on Jun. 24, 2004, at http://www.prnewswire.com/gh/cnoc/comp/196575.html, 2 pgs.

"Final Report: 13th Annual HIMSS Leadership Survey Sponsored by Superior Consultant Company," 2002, retrieved from the Internet on Jun. 24, 2004, at http://www.himss.org/2002survey/print_versions.htm, 28 pgs.

Freed, N., "Behavior of and Requirements for Internet Firewalls," retrieved from the Internet on Jun. 18, 2004, at ftp://ftp.isi.edu/in-notes/rfc2979.txt, 7 pgs.

Hofmann, Markus, et al. "Open Pluggable Edge Services (opes)," retrieved from the Internet on Jun. 18, 2004, at http://www.ietf.org/html.charters/opes-charter.html, 4 pgs.

The Honeynet project, "Know Your Enemy: Statistics," Jul. 22, 2001, retrieved from the Internet on Jun. 18, 2004, at http://project.honeynet.org/papers/stats, 7 pgs.

Imielinski, Tomasz, et al., "Mobile Wireless Computing: Solutions and Challenges in Data Management," WINLAB Rutgers University, 1993, retrieved from the Internet at http://citeseer.ist.psu.edu/cache/papers/cs/269/ftp:zSzzSzwww.cs.rutgers.eduzSzpubzSztechnical-reportszSzdcs-tr-296.pdf/imielinski93mobile.pdf, 38 pgs.

Ipsec IETF working group, "IP Security Protocol (ipsec)," retrieved from the Internet on Jun. 22, 2004, at http://www.jetf.org/html.charters/ipsec-charter.html, 3 pgs.

"IP Spoofing Demystified," Jun. 1996, retrieved from the Internet on Jun. 18, 2004, at http://ftp.cdut.edu.cn/pub/document/book/IP-spoof.pdf, 12 pgs.

Julian, Ted, et al., "The Forrester Report: Turning Security On Its Head," Forrester Research Inc., Jan. 1999, retrieved from the Internet on Nov. 16, 2004, at http://www.atstake.com/company_info/acrobat/turning_security_on_head.pdf, 15 pgs.

Kaspersky Labs, "'Worm' Crawls into the KaZaA Network," May 18, 2002, retrieved from the Internet on Jun. 18, 2004, at http://www.kaspersky.com/news.html?id=738605, 1 pg.

Keadle, Laura, "Comparison Shopping For Scalable Firewall Products," SANS Institute, Aug. 13, 2001, retrieved from the Internet at http://rr.sans.org/firewall/shopping.php, 9 pgs.

Kelly, Kevin, "New Rules for the New Economy: 10 Radical Strategies for a Connected World," Viking, 1998, retrieved from the Internet on Jun. 24, 2004, at http://www.kk.org/newrules, 101 pgs.

King, Steve, et al., "The Case for IPv6," Internet Architecture Board, Dec. 25, 1999, retrieved from the Internet on Jun. 22, 2004, at http://www.6bone.net/misc/case-for-ipv6.html, 50 pgs.

Leiner, Barry M., et al., "The Past and Future History of the Internet," *Communications of the ACM*, Feb. 1997, vol. 40, No. 2, pp. 102-108.

McCurley, Kevin S., "Cryptography and the Internet: Lessons and Challenges," abstract for an invited talk at AsiaCrypt '96, retrieved from the Internet on Jun. 22, 2004, at http://www.swcp.com/~mccurley/pubs/outline.html, 6 pgs.

Meadows, Catherine, "A Formal Framework and Evaluation Method for Network Denial of Service," PCSFW: Proceedings of the 12th Computer Security Foundations Workshop, 1999, retrieved from the Internet at http://chacs.nrl.navy.mil/publications/CHACS/1999/1999meadows-CSFW99.pdf, 11 pgs.

Morrissey, Peter, "Follow the Mellow Brick Road," Lucent Technical Material, Network Computing Magazine, Nov. 12, 2001, retrieved from the Internet at http://ww.lucent.com/livelink/220746_TechnicalMaterial.pdf, 4 pgs.

Oasis, "Technical Overview of the OASIS Security Assertion Markup Language (SAML) V1.1," May 11, 2004, retrieved from the Internet on Jun. 22, 2004, at http://www.oasis-open.org/committees/security/#documents, 19 pgs.

Odlyzko, Andrew, "The History of Communications and its Implications for the Internet," AT&T Labs—Research, Jun. 16, 2000, retrieved from the Internet at http://www.dtc.umn.edu/~odlyzko/doc/history.communications0.pdf, 160 pgs.

Perkins, Charles E., et al., "Mobility Support in IPv6," *Proceedings of the Second Annual International Conference on Mobile Computing and Networking (MobiCom '96)*, Nov. 10-12, 1996, New York, USA, retrieved from the Internet on Jun. 24, 2004, at http://www.monarch.cs.cmu.edu/monarch-papers/mobicom96.ps, 11 pgs.

Posegga, Joachim, et al., "Wireless Internet Security," Informatik Spektrum, Dec. 24, 2001, pp. 383-386 [translation provided].

Ranum, Marcus J., "Thinking about Firewalls," Digital Equipment Corporation, Washington Open Systems Resource Center, 1994, 10 pgs., retrieved from the Internet on Jun. 24, 2004, at http://www.deter.com/unix/papers/firewalls_ranum.pdf.

"Squid Web proxy Cache," retrieved from the Internet on Jun. 18, 2004, at http://www.squid-cache.org, 12 pgs.

Richmond, Robert, "Personal Firewall Comparison," Nov. 4, 2000, retrieved from the Internet on Jun. 18, 2004, at http://www.sysopt.com/reviews/firewall, 23 pgs.

Schiller, Jeffrey I., "Encryption and Security Requirements for IETF Standard Protocols," Jul. 2001, retrieved from the Internet on Aug. 18, 2004, at http://www.ietf.org/internet-drafts/draft-jetf-saag-whyenc-00.txt, 8 pgs.

"Web Services Trust," retrieved from the Internet on Jun. 18, 2004, at http://www.entrust.com/trustwebservices, 1 pg.

"XML Web Services Accelerates Current Trend in Enterprise Security," May 2, 2002, retrieved from the Internet on Jun. 18, 2004, at http://www.xwss.org/articlesThread.jsp?forum=34&thread=772, 5 pgs.

Zakon, Robert H., "Internet Growth," *Hobbes Internet Timeline*, statistics from numerous sources, copyright 1998, retrieved from the Internet on Jun. 18, 2004, at http;//www.nic.funet.fi/index/FUNET/history/internet/en/kasvu.html, 8 pgs.

* cited by examiner

APPLICATION LEVEL SECURITY

CROSS REFERENCE TO RELATED APPLICATIONS

This application claims the benefit of priority from U.S. Provisional Application Ser. No. 60/385,548, entitled "Application Level Security" and filed on Jun. 5, 2002.

BACKGROUND

The following description relates to computer network security, for example, providing security between applications exchanging data.

As businesses continues to expand their use of computing devices, the information technology (IT) infrastructure has continued to grow more and more heterogeneous. The IT infrastructure may be characterized by variant device architectures, device capacities, device capabilities, networks, applications, and administrative domains. This growing heterogeneity is especially present with the expanded use of mobile computing devices. Whether the heterogeneity occurs by choice or by circumstance, it exists, and is growing.

To allow users to access applications in a heterogeneous IT infrastructure, an open environment, that is, one that allows users easy access to applications in other parts of the IT infrastructure, may be used. Open environments may allow distributed, disparate systems to interact based on lowly coupled messaging.

However, as a result, high-level business requirements, particularly security, often become lost in a mesh of technology, networks, devices, and software. Furthermore, the requirements may become lost in a maze of decision makers, implementers, and users, such as managerial, administrative, production, and sales personnel.

SUMMARY

The present disclosure describes systems and techniques relating to application layer security.

In one aspect, a method performed at a security service arbitrator may facilitate application layer security. The method may include receiving a security tender including security requirements for an application, searching for security services to fulfill the security requirements, determining that the security services satisfy the security requirements, and generating a security contract for the application, the security contract specifying how the application is to communicate with the security services. The security requirements in the tender may vary depending on application communication functions, and the security contract may allow the application to communicate directly with the security services that satisfy the security requirements. The method may be performed manually, by machine, by instructions encoded in computer-readable media, or otherwise.

Particular implementations may include binding a contract with an application.

Some implementations may include receiving remote security requirements from a remote arbitrator, determining whether the security services satisfy the remote security requirements, and generating a message regarding the security services. Certain implementations may include generating the security contract for the application based on the security services.

Particular implementations may include monitoring a contract to determine whether it is still valid and, if the contract is not still valid, revoking the contract. The contract may be revoked if it is determined that a predetermined period of time has expired.

In certain implementations, generating a security contract for an application may include selecting between a set of security services that satisfy a security requirement.

In another aspect, a method performed by an application may facilitate application layer security. The method may include generating a security tender, the security tender containing security requirements for the application, and determining whether a security contract has been received, the contract specifying how the application is to communicate with security services that satisfy the security requirements. The method may be performed manually, by machine, by instructions encoded in computer-readable media, or otherwise.

Particular implementations may include determining whether communication is desired with a second application, contacting a security service based on a type of communication, and communicating with the second application in accordance with the security service.

Certain implementations may include determining is a contract is still valid and, if the contract is not still valid, terminating communication with a second application.

Some implementations may include determining whether a security contract is acceptable and, if the security contract is not acceptable, refusing to communicate using the security contract.

In still another general aspect, a system includes an article including a machine-readable medium storing instructions and an arbitrator. The instructions are operable to cause one or more machines to perform operations including generating a security tender, the security tender containing security requirements for the application, and determining that a security contract has been received, the contract specifying how the application is to communicate with security services that satisfy the security requirements. The instructions are further operable to cause one or more machines to perform operations including determining whether communication is desired with a second application, contacting a security service based on a type of communication, and communicating with the second application in accordance with the security service. The instructions are further operable to cause one or more machines to perform operations including determining whether the contract is still valid and, if the contract is not still valid, terminating communication with the second application. The arbitrator is operable to receive the security tender, search for security services to fulfill the security requirements, the security requirements varying depending on application communication functions, determine that the security services can satisfy the security requirements, and generate the security contract. The arbitrator is further operable to bind the contract with the application, receive remote security requirements from a remote arbitrator, determine that security services that can satisfy the remote security requirements exist, , generate a message regarding the security services, and generate a security contract for an application based on the security services that can satisfy the security requirements. The arbitrator is further operable to monitor the security contract to determine whether it is still valid and, if the contract is not still valid, revoke the contract.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

The systems and techniques described here relate to providing security in computer networks. In particular, the systems and techniques relate to providing security for applications at the application layer.

Figure 1:
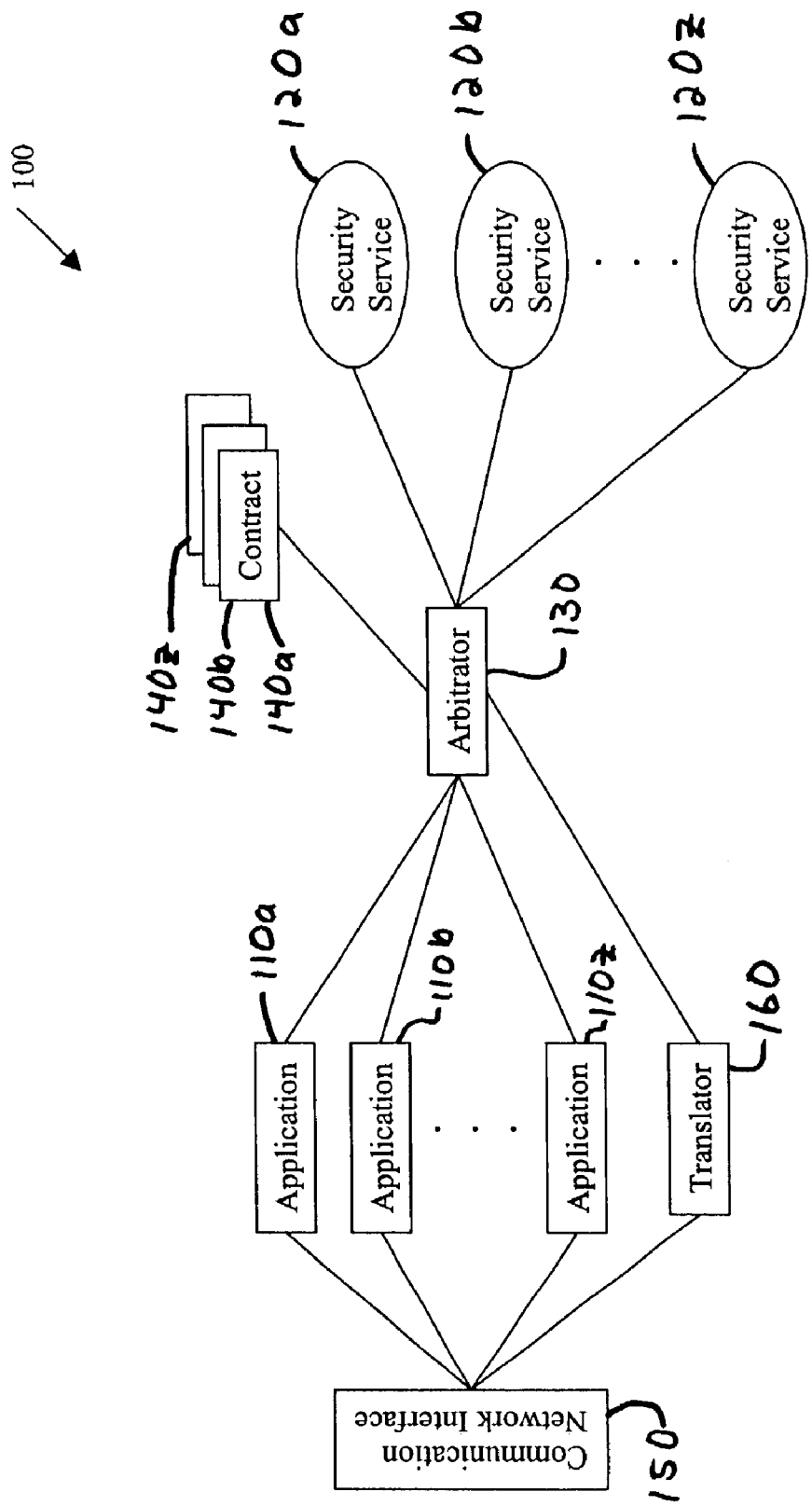
FIG. 1 shows a block diagram of a system for providing application layer security.

FIG. 1 illustrates a system 100 for providing application layer security. In general, system 100 includes applications 110 that have security requirements, such as, for example, authentication, authorization, and/or encryption. The security requirements are provided by security services 120. An arbitrator 130 acts to identify the appropriate security services 120 for applications 110 and provide the applications with the ability to access the security services.

In more detail, applications 110 may be applications maintained by a corporate domain, application services maintained by a corporate domain, client applications issued to remote users, and/or any other type of computer program and/or supporting service. For example, one application may be a Web browser and another application may be a stock quote server that sends stock quotes to the Web browser. Applications 110 may operate in client-server relationships, peer-to-peer relationships, or any other appropriate relationships.

Security services 120 may be any type of programs equipped to meet one or more security requirements for applications 110. For example, security services may provide authentication, authorization, encryption, audit, validation, and/or signature services. Examples of security services 120 include using digital certificates such as X.509 for authentication and 3DES/AES for encryption.

Arbitrator 130 may be any appropriate program for associating security services 120 with applications 110 based on the security requirements of applications 110. In doing so, arbitrator 130 forms contracts 140, which allow applications 110 to access security services 120 directly. A contract is basically a container for a set of security stipulations and requirements that an application should meet, as specified by the issuing domain, for a set of terms. As such, a contract provides an interface between an application and the appropriate security services. Arbitrator 130 may reside within a particular administrative domain—a technically defined scope of interconnected software and hardware for which an entity is a designated administrator—such as a corporate domain. Furthermore, it may be trusted to be rational with other domains.

Security services 120, arbitrator 130, and contracts 140 may be part of a trusted core of a domain. A trusted core is a region in a domain that qualifies as trusted based on the domain-dependent grounds for trust, such as hardware, position, or knowledge of the closed system capabilities. Furthermore, arbitrator 130 may have a trusted interface for communicating with applications 110 and an embedded interface for communicating with contracts 140. An interface is basically a mechanism to link disparate processes and/or components. System 100 also includes a communication network interface 150. Interface 150 allows applications 110 to communicate with remote applications and/or application services to obtain or provide data and/or services. Interface 150 may provide an interface to the Internet, an X.25 network, a frame relay network, the Public Switched Telephone Network (PSTN), or any other appropriate network for conveying data.

System 100 additionally includes a translator 160. Translator 160 is responsible for translating contracts between arbitrator 130 and applications if the language codings between both are incompatible. For example, if the arbitrator encodes a contract in Extensible Markup Language (XML), but an application expects a contract encoded in Resource Description Framework (RDF), then the translator would perform a transcoding. Translator 160, therefore, would not be required in all implementations.

In one mode of operation, when one of applications 110 requires security services, possibly at application initiation, the application generates a security tender containing the application's security requirements. The security requirements for an application may vary depending on the phase of the application, such as, for example, initializing, connecting, listening, accepting, sending, and querying. The nomenclature for these phases may become the terms of the contract. The application sends the security tender, which may be encoded in the language of the application, an open standard such as XML, or any other appropriate description language, to arbitrator 130. Arbitrator 130 may provide the ability to process one or more languages.

Upon receiving the security tender, arbitrator 130 examines the terms and security requirements and compares them to security services 120 to find services that can satisfy the security requirements. In particular implementations, the arbitrator 130 may assume that the terms appear in a sequential order in the security tender. A security service, for example, may satisfy a security requirement if it meets or exceeds the requirement. For instance, if an application desires 56-bit encryption, but a security service provides 128-bit encryption, the security service may satisfy the security requirement. If multiple security services satisfy a security requirement, the arbitrator 130 may select one of the security services. The arbitrator 130 may accomplish the selection based on a prioritized list that may be set apriori or received from the tendering application, on determining which of the security services most closely matches the security requirements, or on any other appropriate criteria.

After determining whether there are security services that can satisfy the security requirements, arbitrator 130 forms a contract for the application if satisfactory security services are available. A contract basically informs the application how to contact the satisfactory security services. For example, the contract may include interfaces and bindings for contacting the security services. The contract is then conveyed to the tendering application.

In particular implementations, the "terms" of the contract are contained in the security tender. Within the contract, the terms are associated with particular security requirements, the stipulations. The security requirements are, therefore, the interface to the security services. An interface, for example, may be a uniform resource locator (URL). A service binding may be performed on the contract, as different security services may have different ways of being accessed.

An example of how the interface to a contract is integrated within one of the applications 110 is shown below:

```
public class PerformanceDataEnquiry
{
public PerformanceDataEnquiry( ) // Constructor
{
    CONTRACT.ENFORCE("INIT");
}
public String viewPerformanceData( )
{
    CONTRACT.ENFORCE("CONNECT");
        :
    CONTRACT.ENFORCE("RECEIVE");
        :
    CONTRACT.ENFORCE("QUERY");
        :
}
public void compareFigures( )
{
    CONTRACT.ENFORCE("PROCESS");
}
public void exit( )
{
    CONTRACT.ENFORCE("FINALIZE");
        :
}
}.
```

An example of a portion of a contract that could be enforced when the "CONTRACT.ENFORCE" terms are issued is shown below:

```
Term: [Identifier]
{
Stipulations =
list of Controls
{
•Type [Authentication . . .]
•Specification [PubKey . . .]
•Algorithm [RSA . . .]
}
}.
```

The contract portion would be enforced when the appropriate "CONTRACT.ENFORCE" command is issued.

The developer may identify where the phases are in the application logic and insert the "CONTRACT.ENFORCE (Term r)" commands. Thus, the application 110 may enforce its security requirement as the ordering of the terms of the contract 140 are included in the application logic.

Note that the "specification" and "algorithm" fields may be left open in the security tender, leaving the arbitrator 130 the task of linking them to the appropriate, available security service. If, however, the security requirements are strict such that they specify the algorithm, for example, then the algorithm is in the security tender, and eventually reflected in the contract 140. The instance of the contract 140 may be supplied when the application 110 is initiated.

Each application 110 may have a unique identifier (ID) for its environment. This may be stored with the descriptive elements of the security tender and contract. To facilitate devices with limited memory and processing power, the arbitrator methods may operate mainly on indexes to items described in the descriptive elements.

The enforce commands should follow a logical sequence. In the case of decision branches, some of the enforce commands may be at the same level in the sequence. Therefore, it would probably be beneficial to consider security concerns beginning in the design phase. That is, a developer should consider whether there will be security risks within this logic block.

Once the tendering application 110 has the contract, it may access security services 120 directly. For example, if the application 110 has received data and is deciding whether to accept it, the application 110 may call a decryption service to decrypt the data and an authentication service to determine whether the data is valid. As another example, if the application 110 is preparing to send data, it may call an authentication service to provide indicia of authentication, such as a digital certificate, and an encryption service to encrypt the data. Another example of an authentication service is a time-based token authentication, an example of which is available the SecurID product from RSA. Other examples of security services include confidentiality for channel communications, and data integrity based on crytpo-hashes, such as, for example, MD5 or SHA1.

As shown, arbitrator 130 also maintains a copy of contracts 140. Thus, arbitrator 130 may provide administrative functions to the contracts. Administration may include monitoring the contracts 140 to determine whether they have become invalid. A contract may become invalid, for example, if a predetermined time for the contract expires, if an underlying mechanism such as a certificate expires, or if an environment change, such as, for example, loss of a network connection, breaches the contract. If the contract 140 becomes invalid, the arbitrator 130 may send a send a revocation message, possibly via an internal interface, to the application.

The system 100 illustrated by FIG. 1 may have a variety of features. For instance, the system 100 may enhance specification, integration, flexibility, and/or administration of security mechanisms in heterogeneous environments.

For example, applications 110 may be integrated into the security context of the deployment environment and existing security services may be leveraged by arbitrator 130. Moreover, context upgrade with new security technologies may be performed centrally and seamlessly by conforming to the interface specification of the arbitrator 130. Thus, security policies may be defined regardless of the IT infrastructure, with the arbitrator 130 transforming them into proprietary configuration requirements expressed in the contracts 140.

For instance, the security scheme may allow the same security requirements to be adapted based on the application deployment environment. For example, if an application is deployed in a portable computer environment, the application may have access to RSA and AES security services, but if deployed in a cellular telephone environment, the application may have access to Blowfish, DH, and DSA security services. The arbitrator 130 adapts the security requirements to security services 120 in these different environments. Thus, a security policy may be implemented in different deployment environments, which assists higher level management of security policies by providing a homogeneous layer with which to manage. Moreover, this technique provides centralized security policy specification, distribution, and maintenance.

As an additional example, the system 100 may allow administrators to manage security policies from the perspective of applications, as opposed to a focus on the network level. This should allow administrative complexity to be reduced. As such, system 100 may provide a method for implementing and administering secure mobile business applications.

As a further example, flexibility is demonstrated by the loose coupling of security mechanisms, operating environment, and applications through the security contract. This allows modification of security mechanisms consistent with the evolution of applications and associated policies. This loose coupling, moreover, allows for scaling.

For instance, the architecture could be implemented on a mobile phone with a Subscriber Identity Module (SIM) card maintaining a local registry of security services, a library of security services, and security services. An arbitrator in the SIM may upload charging information of the operators in the user's vicinity from a corporate directory, and the user could establish a connection to his company's intranet depending on the uploaded information, which could be updated as the user roams from network to network. The arbitrator may offer the user a security versus performance tradeoff based on the facilities of the roamed network.

Furthermore, the use of contracts 140 at the application layer may allow higher-level administrative support for configuring lower-level mechanisms. Thus, heterogeneity may be managed at an abstract level of homogeneity, where the functional specifications are defined, and where multiple roles seek to reach a common understanding of operations.

Additionally, the complexity of security may be decoupled from the application, while still allowing the application to enforce security. This may be facilitated by an agreement on the nomenclature for phases of the application. Agreement on such between management, security specialists, and developers, should allow interpretation of security requirements to be better collaborated, incorporated, and realized. By allowing this, corporate policies may be enforced, allowing administrators to focus on managing the efficient use of the corporate process, as opposed to becoming emergency response personnel. Furthermore, managers may exercise control over matters of technical security.

System 100 also may reduce the functions of arbitrator 130, because the arbitrator 130 does not have to be involved in security through the lifetime of a connection. For example, the arbitrator 130 may be used only at very specific times, such as installation of applications 110, where it may be used to aid installation-time configuration and binding of applications to security services 120 and mechanisms in the installation domain.

In system 100, security for an application may be considered as the supply of conditions and the reception of satisfactory evidence that the conditions are being met. Security may then be considered as a multi-dimensional workflow. Each application has different conditions, and these require different forms of evidence satisfied by variant certifiable work items. Conditions initiate the workflow and evidence must be returned in order for the workflow to be certified. In this process, roles may be associated with auditable interests (i.e., conditions and the satisfying evidence). Defining a security workflow may facilitate application security at the business process level. The arbitrator 130 is used to adapt to tailored security needs. Moreover, end-users may be allowed to configure to their requirements.

System 100 may also provide the ability to distribute the administrative responsibility and auditing for security. The responsibility may be distributed horizontally or vertically, but possibly with centralized overview through an audit manager. Vertical responsibility distribution means that the security and policies may be determined and translated between business, application, or network level through the audit manager and/or arbitrator. Applications also carry out independent audits that may be collated by the audit manager, such that the responsibility may be horizontally distributed per application.

Furthermore, system 100 may facilitate incorporation of security policy into an application beginning at the application design process by the use of "security requirements announcement" and "security contract" object message types. Moreover, these may allow independence of underlying message exchange protocol between application and arbitrator, as well as security mechanisms to be used (i.e., the security mechanism must meet the requirements expressed by the "security recruitments announcement" before agreeing to a "security contract").

Additionally, because applications may be responsible for enforcing their own security requirements, some key security-specific issues are ameliorated. For example, spoofing or session hijacking, which are prevalent in wireless networks, are reduced, as transactions are sanctioned and committed by the application, which is inherently aware of permissible data formats. For instance, an illegal SQL statement aimed at accessing a back-end database may be detected and dropped. The session is, therefore, validated at the application end-points, and not just left up to the lower-level protocols Furthermore, by having authentication, privacy, and confidentiality enforced at the application layer, there should be no higher-layer protocols that by-pass the security enforcement point.

System 100 may be recognized in a local area network, a wide area network, a federation (where a particular device could assume the role of arbitrator), or even within a device (where the arbitrator is just a localized service or process.)

In particular implementations, the arbitrator 130 may have a linking function, which may be its own component in the arbitrator 130. The linking function basically produces binding between the application 110, contract 140, and relevant security services 120 based on the terms specified by the application 110. In doing so, the linking function of the arbitrator 130 may make decisions about what commands should be forwarded to the security service 120, and the contract 140 could remain an inert object such as an XML document, which may lead to a resource-friendly implementation. The linking function may maintain a meta state machine of the application's expected execution state and/or a state of the security class by the application to the security services 120. The linking function, however, is an assistant to the application for enforcement, as opposed to the point at which enforcement is initiated or completed.

As an example, linking may be based on the term (r) and the next term to be bound (r'). If r is equivalent to r'(r==r'), then the relevant security services are invoked (e.g., INIT may be mapped to an Authentication service). If r has already been enforced (r<r'), then the security service is invoked as an assertion (e.g., if INIT is called in the same session, this is equivalent to a single sign on). If r is called ahead of other dependent terms (r>r'), then the arbitrator 130 issues a notification, logs the event, and tries to assert the prior security services. If the term specified is unknown or not agreed to in the contract (if r==?), the arbitrator 130 issues a notification to the user and logs this event.

Note that if a particular term cannot be met, a notification may be generated that the functionality is limited for security purposes. Of course, if the term is important, service may be denied.

In certain implementations, an audit service may be included. An audit service, in general, logs key application events. Auditing may be used for collection and organization of accountability data. An audit service may be a software component, a specialized piece of hardware, or otherwise. The applications may be responsible for defining and maintaining their audit mechanisms.

In particular implementations, security libraries may be bundled to supplement service requirements. An application may refer to the libraries for completion of its security specification. For example, in the event that the relevant services are not available in the local service domain, the application and arbitrator consult the library to make sure that the security requirements will be met. Security is, therefore, enforced and coordinated by the application.

Figure 2:
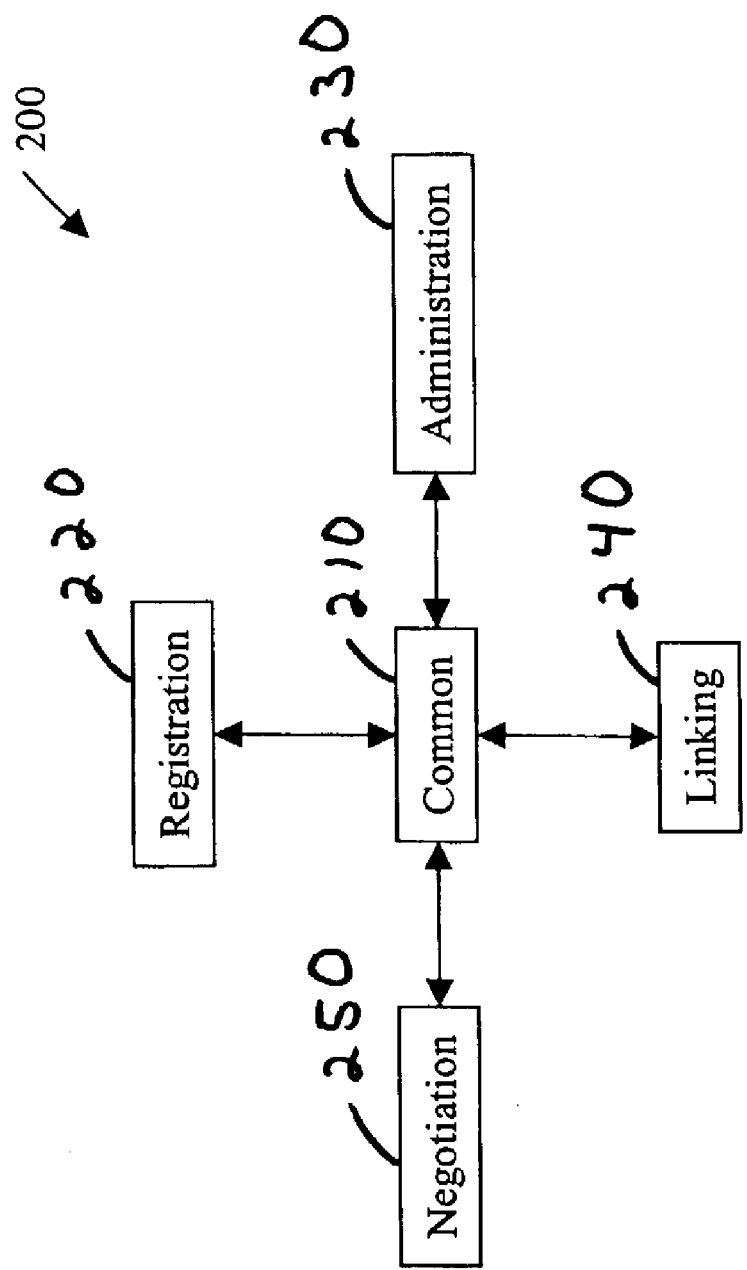
FIG. 2 shows a block diagram of an arbitrator for providing application layer security.

FIG. 2 illustrates an arbitrator 200 for providing application layer security. Arbitrator 200 may be similar to arbitrator 130 in FIG. 1.

As illustrated, arbitrator 200 includes common functions 210, registration functions 220, administration functions 230, linking functions 240, and negotiation functions 250. Common functions 210 are responsible, for example, for managing communications with other programs and coordinating the activities of functions 220-250. Registration functions 220 are responsible for receiving a security tender, finding appropriate security services in response to the security tender, and forming a security contract based on the discovered security services. Administration functions 230 are responsible for monitoring the status of contracts generated by registration functions 220. Contracts may, for example, expire, be revoked, and/or be updated. Functions 230 are responsible for monitoring for these situations and informing appropriate components if relevant events occur. Linking functions 240 are responsible for producing the binding of applications, contracts, and security services. Negotiation functions 250 are responsible for establishing sessions with other domains. For example, functions 250 may negotiate with arbitrators in different domains to determine whether security services are available for a foreign-domain application in the arbitrator's domain.

Although FIG. 2 illustrates one example of an arbitrator, other arbitrators may have less, more, and/or a different arrangement of components. For example, an arbitrator may not have one or more of registration functions 220, administration functions 230, linking functions 240, and negotiation functions 250. As another example, some or all of the functions may be grouped together, either logically or physically.

Figure 3:
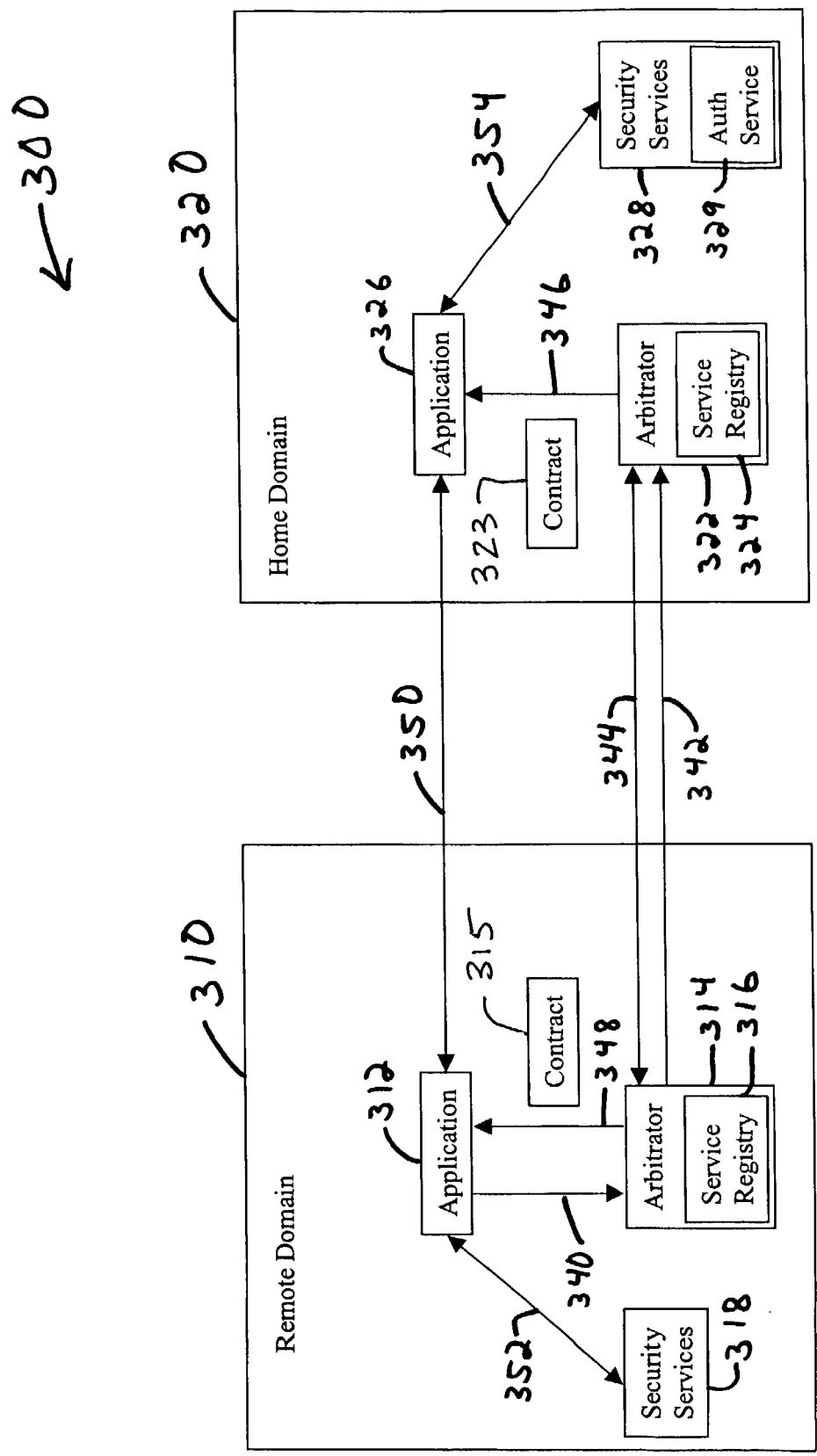
FIG. 3 shows a block diagram of a system for providing application layer security.

FIG. 3 illustrates an implementation of a system 300 for application layer security. As illustrated, system 300 includes a remote domain 310 and a home domain 320. Typically, remote domain 310 wants to access data and/or services in home domain 320. Securing the delivery of the data and/or services may be important, especially if they will travel across a public network between the domains. Remote domain 310 may, for example, be a personal computer. Home domain 320 may, for example, be a corporate IT infrastructure.

Remote domain 310 includes an application 312, an arbitrator 314, and security services 318. Note that security services 318 would not be required in every implementation. Application 312 is the entity desiring data and/or services from home domain 320. Application 312 may be, for example, a Web browser. Arbitrator 314 is responsible for establishing the security contract 315 for application 312 based on security services 318. In accomplishing this, arbitrator includes a security service registry 316 that specifies the types of security services 318 available in remote domain 310. The arbitrator 314 may be, for example, deployed by home domain 320 to a user and may be, for example, incorporated into a smart card.

Home domain 320 includes an arbitrator 322, an application 326, and security services 328. Arbitrator 322 is responsible for coordinating with arbitrator 314 to form a security contract 323 for application 312. In accomplishing this, arbitrator 322 includes a security service registry 324 that specifies the types of security services 328 in home domain 320. Registry 324 may contain service identification parameters, description, audit summary, and other information relevant to negotiating security service selection. Application 326 is the application with which application 312 ultimately desires to communicate. As illustrated, security services 328 includes an authentication service 329. Authentication service 329 is responsible for providing validation services and may be part of a Web service. Furthermore, authentication service 329 may be part of a Authorization, Authentication, and Accounting (AAA) server.

Arbitrator 322 may be similar to the previously discussed arbitrators. Application 326 may be, for example, a stock availability matrix, providing confidential figures and statistics about the stock market. Security services 328 may include any appropriate security services. Authentication service 329 may be an ACE-Server (the corporate server which facilitates One Time Token verification) and/or Remote Authentication Dial-In User Service (Radius) and lightweight directory access protocol (LDAP).

In one mode of operation, a service connection protocol (SCP) is used between arbitrators deployed in different domains and users and their applications interacting with their assigned arbitrator. Typically, arbitrator 314 and arbitrator 322 interact to negotiate a security context between application 312 and application 326.

Remote domain 310 may be a trusted environment, for instance, issued by home domain 320 with pre-installed applications and arbitrator 314. In order to gain access to application 326, a confidential channel may be established between application 312 and application 326. A discussion regarding the initial steps in setting up a confidential channel, thereby clarifying the negotiation protocol, is provided below.

The connection process may be initiated by a user activating a device in remote domain 310 and/or application 312. Upon activation, arbitrator 314 prompts the user to connect to home domain 320 or work offline. Arbitrator 314 may be aware of the user's actions because the device/application contacted it via an internal interface. Assuming home domain 320 is requested for further work, a connection may be established. If the user chooses to work offline, no further operations are required by arbitrator 314.

Typically, an authentication process has to be performed by the user to access home resources, which is exemplary of other security services. To accomplish this, the user passes (340) his security tender, including his available authentication mechanism(s), which, may be, for instance, a one-time password generator such as an RSA SecurID Card, to arbitrator 314. The authentication process may be seen as a first example for a security service and not at all exhausting the set of available security services. Typically, an authentication service is invoked in order to set up a confidential communication channel to access corporate resources. This may be viewed, however, as a request for arbitrary security services. Arbitrator 314 handles further operations related to security on the user's behalf.

Arbitrator 314 then negotiates with arbitrator 322 for the security services. To accomplish this, arbitrator 314 contacts arbitrator 322, establishes a confidential channel, and sends (342) the user's available authentication mechanism(s), along with further session information, such as, for example, the target corporate resource, to arbitrator 322. Arbitrator 322 consults registry 324 to verify the user's authentication mechanism(s). If one of the required authentication mechanisms is available in corporate domain 320, arbitrator 322 generates a success message and sends (344) the message to arbitrator 314. Arbitrator 322 also generates a domain 320 contract for application 326, that is, the application that the user's request aims to access, and informs service 326 of the request's validity by issuing (346) the contract to the service.

When arbitrator 314 receives the message from arbitrator 322, it generates a contract and issues (348) the contract to application 312. The contents and enforcement of the contract may be similar to those discussed previously.

Note that the contract in remote domain 310 and the contract in home domain 320 may be the same or different. For example, if the security services in the domains have different names (e.g., ID strings), the contract would differ. The differences, of course, may be graver, like different description languages. However, since the contracts are not passed between domains, differences between the two may not be significant. To verify the validity and possession of the contracts on both sides, it may not be necessary to retransmit the contracts in their entirety. For example, an existing mechanism based on digital signatures such as XML-Sig may suffice.

In particular implementations, both arbitrator 314 and arbitrator 322 keep track of issued contracts. The contracts, for instance, may be in a flat XML-coded file in a local database.

After receiving the contract, application 312 sets up (350) a confidential connection to application 326 by performing the security service communications stated in the contract, beginning with being validated by an authentication service. During the authentication process, application 312 may access (352) the security services 318 specified in its contract. Furthermore, application 326 may access (354) security services 328 specified in its contract. Hence, an authentication service invoked in the remote domain 310 has a counterpart in the home domain 320 to authenticate against. Using these, the applications may authenticate each other.

The arbitrators also may administer the contracts. For example, as discussed previously, an arbitrator may monitor a contract to determine whether it becomes invalid.

In particular implementations, each arbitrator keeps a record of the issued contract and its contents. This allows each arbitrator to monitor the contract and to revoke an invalid contract independently from the other arbitrator. To revoke the contract, each arbitrator sends a revocation message to its respective application. Thus, no further inter-arbitrator communication via external interfaces may be needed.

It is not desired in every case that an invalid contract should lead to tearing down a service connection. If, for example, a user only needs a few more minutes to review data, it is typically not desirable to go through all steps again to receive a new contract. Therefore, a resubmission of the application's tender according to the negotiation protocol may be possible. Then, the arbitrators may recognize the existing contract and only update the application and the service without affecting the existing connection.

It is likely that the applications and arbitrators will need to be updated or replaced at some point, possibly for faulty or outdated components. Updating and/or replacement varies depending on the component.

An arbitrator is a component that works mostly in a stand-alone mode. Furthermore, it communicates via defined interfaces. This may make it easy to replace or update. In the illustrated example, if arbitrator 314 is issued by a company to one of its employees and running in the tamper resistant environment of a smart card, an update is as easy as handing a new smart card (containing the new arbitrator) to the employee. The smart card is plugged into the user's device and continues with its duties. Existing issued contracts to applications may be announced to the new arbitrator, preferably by the new arbitrator reading a local registry of contracts from the replaced arbitrator. It may, however, be possible to re-register the contracts.

Remote domain and home domain applications may be updated each in the same way. A home domain application may be centrally updated by the company, and a remote domain application maybe updated via an internal download mechanism. But either way comes down to a relatively simple software update. Existing contracts, however, are invalidated during this update process, and the updated application re-announces its security tender to the arbitrator and receives a new contract.

System 300 may have a variety of features. For example, it may have features similar to those discussed for system 100. System 300 also allows secure inter-domain interaction. This is accomplished through higher-level negotiation, translation, and exchange of security policies and capabilities. Furthermore, the inter-domain interaction may be achieved without an security intermediary.

Figure 4:
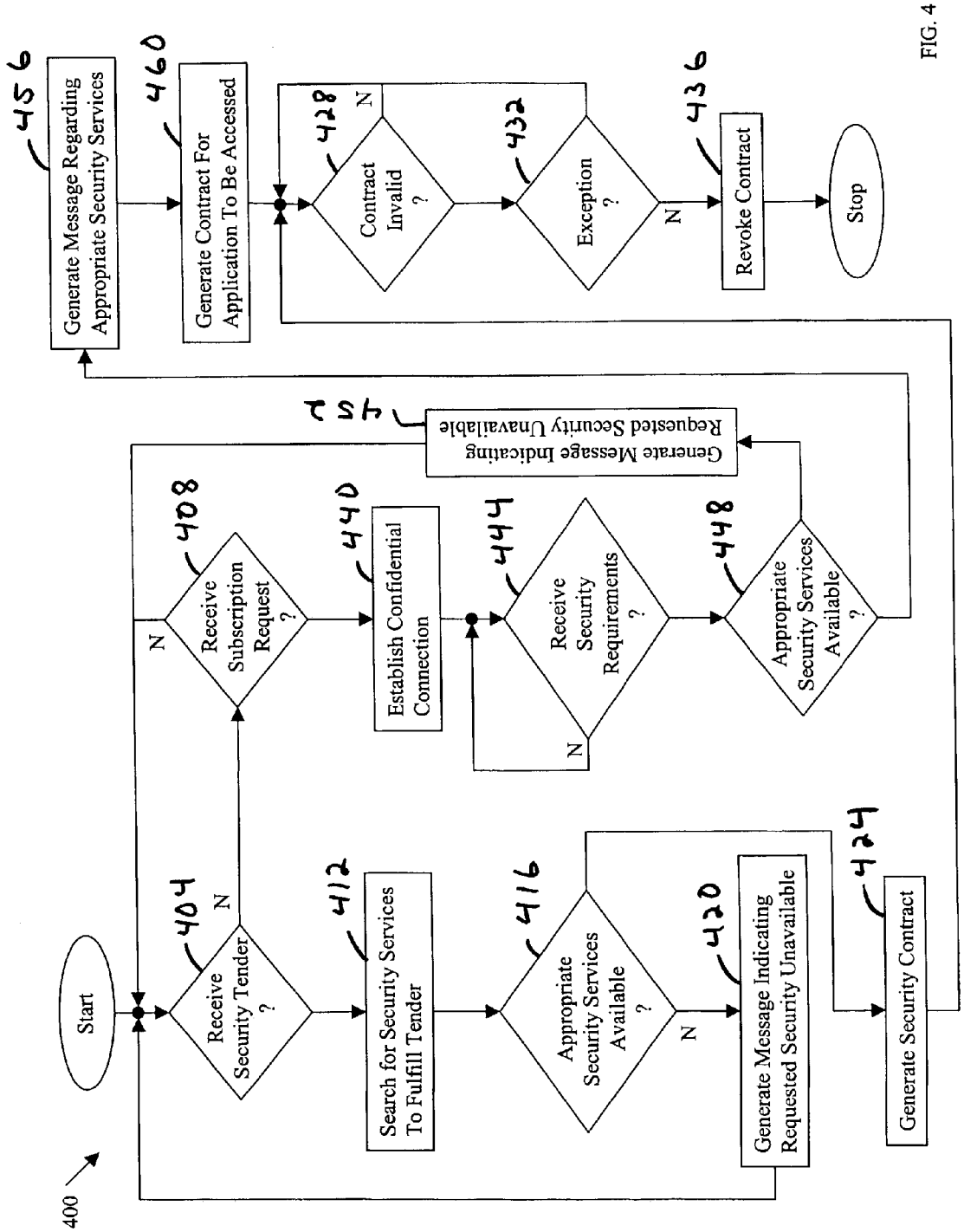
FIG. 4 is a flowchart showing a process for providing application layer security.

FIG. 4 illustrates a process 400 for application layer security. The process may be implemented by an arbitrator similar to arbitrator 130 in FIG. 1.

The process begins with determining whether a security tender has been received at decision block 404. A security tender may, for example, contain the security requirements for an application and be generated when the application is initiated. If a security tender has not been received, the process calls for determining whether a subscription request has been received at decision block 408. A subscription request may be, for example, a request for a data service and be from an arbitrator in another domain. If a subscription request has not been received, the process call for returning to decision block 404 to check for receipt of a security tender.

If a security tender has been received at decision block 404, the process calls for searching for security services to fulfill the tender at function block 412. Security services could include authentication, encryption, and authorization services. The process then calls for determining whether appropriate security services are available at decision block 416. A security service may be appropriate if it meets or exceeds the security requirements expressed by the security tender. If appropriate security services are not available, a message may be generated indicating that the requested security is not available at function block 420. The message may then be sent to the application that initiated the security tender, and the process returns to decision block 404.

If, however, appropriate security services are available, a contract is generated at function block 424. The contract may, for example, specify how the tendering application is to interact with the appropriate security services. The security contract may then be sent to the initiating application.

The process then calls for determining whether the contract is invalid at decision block 428. The contract may be invalid if a predetermined period of time has expired, if an underlying certificate has expired, if the environment has changed, or otherwise. If the contract is not invalid, the process calls for continuing to monitor the contract's status.

If the contract becomes invalid, the process continues with determining whether an exception exists at decision block 432. An exception may exist, for example, if it will only take a little while longer for the application to complete its task. If an exception does exist, the process calls for returning to decision block 428. If, however, an exception does not exist, the process calls for revoking the contract at function block 436. The process is then at an end.

Returning to decision block 408, if a subscription request has been received, the process calls for establishing a confidential connection at function block 440. The subscription request reflects the effort of a remote application to access an application in another domain and may be from a remote arbitrator. The process then calls for waiting to receive security requirements for the subscription at decision block 444.

Once security requirements for the subscription have been received, the process continues with determining whether appropriate security services are available at decision block 448. If appropriate security services are not available, the process calls for generating a message indicating that the requested security is unavailable at function block 452. The message may then be sent to the device that initiated the subscription request, and the process returns to decision block 404. If, however, appropriate security services are available, the process calls for generating a message regarding the appropriate security services at function block 456. The message may then be sent to the device that initiated the subscription request. The process then calls for generating a contract for the application to be accessed at function block 460. The contract may then be sent to the application. The process continues with monitoring the contract.

Although FIG. 4 illustrates a process for application level security, other processes for application layer security may include less, more, and/or a different arrangement of operations. For example, the functions relating to processing a subscription request (e.g., blocks 440-460) may be eliminated. As an additional example, the functions regarding administration (e.g., blocks 428-436) may be eliminated. As a further example, functions regarding linking a contract to security services may be added. As another example, generating a security contract could include selecting between a set of appropriate security services for a security requirement. As an additional example, an arbitrator may be receiving multiple security tenders and/or subscription requests contemporaneously. Thus, it may be generating and/or monitoring multiple contracts at the same time.

Figure 5:
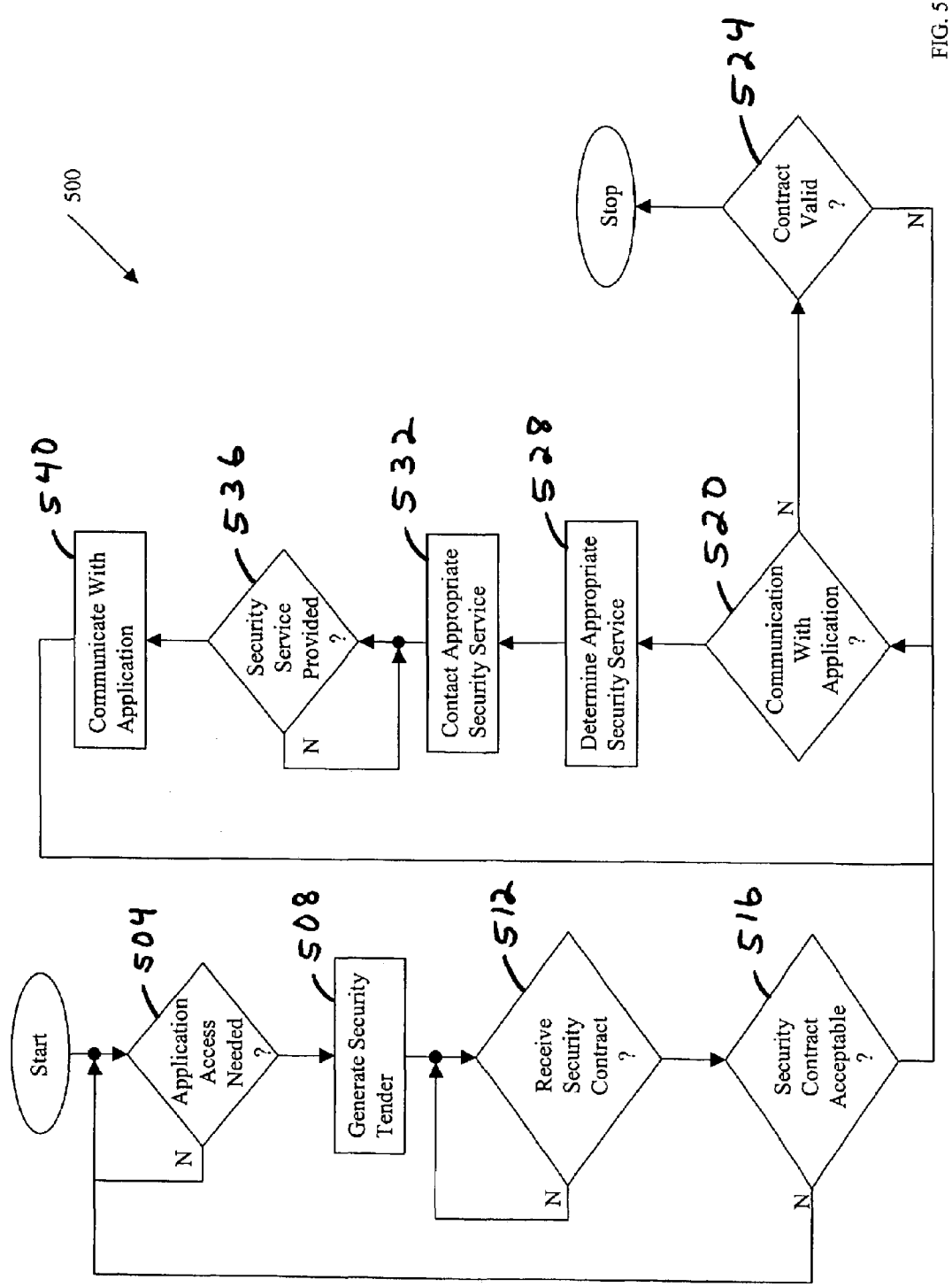
FIG. 5 is a flowchart showing a process for providing application layer security.

FIG. 5 illustrates a process 500 for application layer security. The process may be implemented by an application similar to one of applications 110 in FIG. 1.

The process begins with waiting to determine that access to another application is needed at decision block 504. Access to another application may be needed if data and/or service are required. The process continues with generating a security tender at function block 508. The security tender may express the security requirements for the application desiring access.

The process then calls for waiting to receive a security contract at decision block 512. The contract specifies how the application desiring access is to interact with the appropriate security services. Once the security contract has been received, the process continues with determining whether the security contract is acceptable at decision block 516. A security contract may be acceptable, for example, if the security provided by the identified services exceeds the security requirements. If the security contract is not acceptable, the process calls for returning to decision block 504.

If, however, the security contract is acceptable, the process continues with determining whether communication with another application is desired at decision block 520. Communication with an application could include establishing a connection with an application, sending data to an application, and/or receiving data from an application. If communication with an application is not required, a validity of the security contract still exists at decision block 524. Judging the validity of the contract still exists may be accomplished by, for example, determining whether a message indicating that the security service has been revoked has been received. The message may be in response to a contract status request or otherwise. If the contract is not still valid, the process is at an end. But if the contract is still valid, the process returns to check whether communication with another application is desired at decision block 520.

If communication with another application is desired at decision block 520, the process calls for determining an appropriate security service at function block 528. An appropriate security service may be determined, for example, by examining the contract. The process continues with contacting the appropriate security service at function block 532 and waiting for the security service to be provided at decision block 536. A security service may provide authentication, encryption, authorization, or any other appropriate security scheme. Once the security service has been provided, communication with the other application occurs at function block 540. The process then calls for returning to decision block 520.

Although FIG. 5 illustrates a process for application layer security, other processes for application layer security may include less, more, and/or a different arrangement of operations. For example, the function relating to checking for a revoked contract (i.e., block 524) may be eliminated. As an additional example, the function regarding determining whether the security contract is acceptable (i.e., block 516) may be eliminated. As a further example, functions regarding binding a contract to the application may be added.

Figure 6:
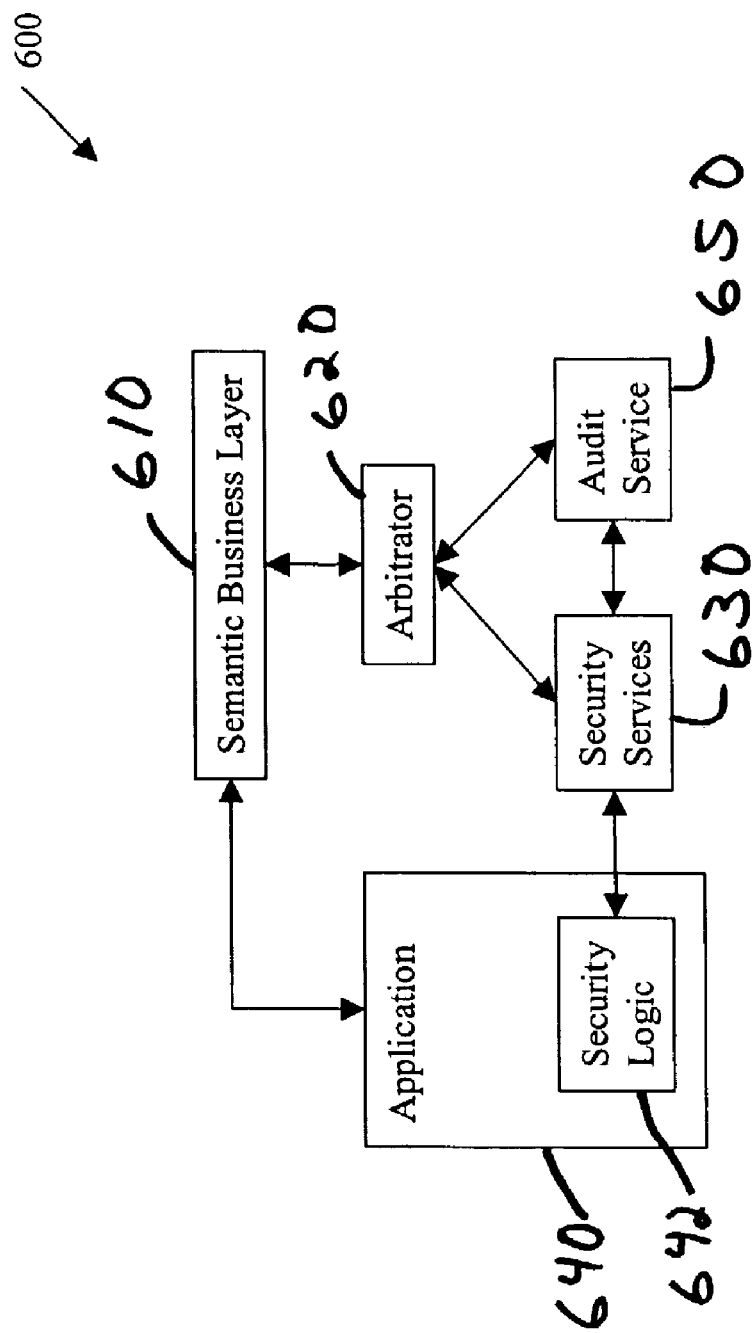
FIG. 6 shows a block diagram of a system for providing application layer security.

FIG. 6 illustrates a system 600 for application layer security. As illustrated, system 600 includes a semantic business layer 610, an arbitrator 620, security services 630, an application 640, and an audit service 650. Arbitrator 620, security service 630, application 640, and audit service 650 may be similar to those discussed previously.

Semantic business layer 610, which is a layer of application 640, provides a platform for coordinating security workflow, where application-dependent conditions are placed in an inbox and removed when their corresponding evidence objects are returned and verified. The workflow may involve different systems, roles, and domains. Layer 610 is referred to as semantic because the terms used should be agreed upon, and taxonomy made available to various workflow participants.

Layer 610 presents the conditions and requested evidence to arbitrator 620, as well as any corresponding roles. The roles may be reused and equivalent to those maintained by an access controller (not shown). Arbitrator 620, based on the conditions and requested evidence from layer 610, as well as the capabilities suggested by the application environment, and application-dependent security requirements, configures application 640 by the use of a contract. The security services required are bound by the contract, and supply evidence of origin and integrity before being invoked.

Based on the request for evidence, audit service 650 is informed of what is to be monitored and the forms of verification to be supplied. There may be various forms of audit systems at work, each capable of obtaining different forms of conditional evidence.

Security services 630 interface with security logic 642 of application 640 via the contract, providing a loosely coupled enforcement and security functionality. Audit service 650 monitors the security activity, while security services 630 make sure that subjects, targets, and actions are accounted for by the audit service.

FIG. 6 has a variety of features. For example, application security may be addressed at the business process level. To accomplish this, a security workflow may be defined, with conditions to be met and corresponding forms of evidence. Each application may have different conditions and/or expectations, and these may require different forms of evidence satisfied by variant certifiable work items. Conditions initiate the workflow and evidence is returned in order for the workflow to be certified. As another example, a well-managed audit trail of conditions and evidence between a system's architecture layers may be created.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., a data server), a middleware component (e.g., an application server), and a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), a personal area network ("PAN"), a mobile communication network, and/or the Internet.

The computing system can include clients and servers. A client and server are generally remote from each other and typically interact through a communication network. The relationship of client and server arises by virtue of computer programs running on the respective computers and having a client-server relationship to each other.

Although only a few implementations have been described in detail above, other modifications are possible. Portions of this disclosure discuss systems and techniques for providing application layer security. In general, however, application layer security may be provided by any appropriate system or technique. Additionally, the logic flow depicted in FIGS. 4-5 do not require the particular order shown, or sequential order, to achieve desirable results. In certain implementations, multitasking and parallel processing may be preferable.

Other implementations may be within the scope of the following claims.

What is claimed is:

1. A method performed by a security service arbitrator, the method comprising:
   receiving a security tender comprising security requirements for an application, the security requirements specifying the application's desired level of security;
   searching for security services to fulfill the security requirements;
   determining that the security services satisfy the security requirements;
   generating a security contract for the application, the security contract specifying how the application is to communicate with the security services;
   receiving remote security requirements from a remote security service arbitrator;
   determining whether the security services satisfy the remote security requirements;
   generating a message regarding the security services; and
   generating a second security contract for an application based on the security services that satisfy the remote security requirements.

2. The method of claim 1, wherein the security requirements in the tender vary depending on application communication functions.

3. The method of claim 1, wherein generating the security contract for the application comprises selecting between a set of security services that satisfy a security requirement.

4. The method of claim 1, wherein the security contract allows the application to communicate directly with the security services that satisfy the security requirements.

5. The method of claim 1, further comprising binding the contract with the application.

6. The method of claim 1, further comprising:
monitoring the contract to determine whether it is still valid; and
if the contract is not still valid, revoking the contract.

7. The method of claim 6, wherein revoking the contract comprises determining that a predetermined period of time has expired.

8. A system comprising:
an arbitrator comprising:
a registrar operable to generate a security contract for an application in response to a security tender, the security tender comprising application security requirements specifying the application's desired level of security;
the security contract specifying how the application is to communicate with security services that can satisfy the security requirements;
an administrator operable to determine whether the security contract is invalid; and
a negotiator operable to:
receive remote security requirements from a remote security service arbitrator;
determine whether security services satisfy the remote security requirements;
generate a message regarding the security services; and
generate a second security contract for an application based on the security services that satisfy the remote security requirements.

9. The system of claim 8, wherein the registrar is operable to:
receive the security tender;
search for the security services to fulfill the security requirements;
determine whether the security services satisfy the security requirements; and
generate the security contract.

10. The system of claim 8, wherein the registrar is further operable to select between a set of security services that satisfy a security requirement.

11. The system of claim 8, wherein the security contract allows the application to communicate directly with the security services.

12. The system of claim 8, wherein the arbitrator comprises a linker operable to bind the contract with the application.

13. An article comprising a physical machine-readable medium storing instructions operable to cause one or more machines to perform operations comprising:
determining whether a security tender has been received at an arbitrator, the security tender comprising security requirements for an application, the security requirements specifying the application's desired level of security;
searching for security services to fulfill the security requirements;
determining that the security services satisfy the security requirements;
generating a security contract for the application, the security contract specifying how the application is to communicate with the security services;
determining whether remote security requirements from a remote security service arbitrator have been received at the arbitrator;
determining whether security services satisfy the remote security requirements;
generating a message regarding the security services; and
generating a second security contract for an application based on the security services that satisfy the remote security requirements.

14. The article of claim 13, wherein generating the security contract for the application comprises selecting between a set of security services that satisfy a security requirement.

15. The article of claim 13, wherein the security contract allows the application to communicate directly with the security services that satisfy the security requirements.

16. The article of claim 13, wherein the instructions are further operable to cause one or more machines to perform operations comprising binding the contract with the application.

17. The article of claim 13, wherein the instructions are further operable to cause one or more machines to perform operations comprising:
monitoring the contract to determine whether it is still valid; and
if the contract is not still valid, revoking the contract.

18. A system comprising:
an article comprising a physical machine-readable medium storing instructions operable to cause one or more machines to perform operations comprising:
generating a security tender, the security tender containing security requirements for the application, the security requirements specifying the application's desired level of security,
determining whether a security contract has been received, the contract specifying how the application is to communicate with security services that satisfy the security requirements,
determining that communication is desired with a second application,
contacting a security service based on a type of communication,
communicating with the second application in accordance with the security service,
determining whether the contract is still valid, and if the contract is not still valid, terminating communication with the second application; and
an arbitrator operable to:
receive the security tender,
search for security services to fulfill the security requirements, the security requirements varying depending on application communication functions,
determine that the security services satisfy the security requirements,
generate the security contract,
bind the contract with the application,
receive remote security requirements from a remote arbitrator,
determine that security services that can satisfy the remote security requirements exist,
generate a message regarding the security services,
generate a security contract for an application based on the security services that can satisfy the security requirements,
monitor the security contract to determine whether it is still valid, and
if the contract is not still valid, revoke the contract.

* * * * *